United States Patent

[11] 3,575,080

[72] Inventor Patrick M. Hannay
 1116 Akron St., San Diego, Calif. 92106
[21] Appl. No. 786,890
[22] Filed Dec. 2, 1968
[45] Patented Apr. 13, 1971
 Continuation-in-part of application Ser. No. 710,904, Mar. 6, 1968, now abandoned.

[54] FASTENER WRENCHING MEANS
 10 Claims, 4 Drawing Figs.
[52] U.S. Cl. .................................................. 85/45, 145/50
[51] Int. Cl. .............................................. B25d 15/00, F16b 23/00, F16b 35/00
[50] Field of Search ........................................... 85/45, 9, 61; 145/50.1; 287/119

[56] References Cited
UNITED STATES PATENTS
| | | | |
|---|---|---|---|
| 2,556,155 | 6/1951 | Stellin .......................... | 85/45 |
| 3,295,572 | 1/1967 | Wing ............................ | 85/45X |
| 3,470,786 | 10/1969 | Martins ....................... | 85/45 |

FOREIGN PATENTS
| | | | |
|---|---|---|---|
| 1,090,665 | 10/1954 | France ......................... | 85/85 |

Primary Examiner—Ramon S. Britts
Attorney—Gausewitz, Carr and Rothenberg

ABSTRACT: A wrenching means for a fastener including a recess having a plurality of pockets in a substantially equally spaced relationship, the pockets being of substantially the same width, and the fastener intermediate the pockets having the same width as that of the pockets, the pockets having forward and rearward driving edges which are planar and, if extended, would intersect at the axis of the fastener.

Patented April 13, 1971

3,575,080

INVENTOR.
PATRICK M. HANNAY

BY

ATTORNEYS.

FASTENER WRENCHING MEANS

REFERENCE TO PARENT APPLICATION

This is a continuation-in-part of my copending application Ser. No. 710,904 filed Mar. 6, 1968 for Fastener Wrenching Means, now abandoned.

BACKGROUND OF THE INVENTION

1. Field of the Invention

This invention relates to a fastener wrenching means.

2. The Prior Art

The need for improved wrenching means for threaded fasteners has led to a continuing research and development program extending over many years. The simple screwdriver slot must be formed by a milling cut or a slitting saw cut. It is not practical for forging or upsetting, so that maximum strength of the fastener head cannot be developed. Hexagonal socket heads for fastener can be made by upsetting, but also must be drilled and broached at considerable expense. The corners of the hexagonal recesses are unable to resist high-wrenching torques. Various cruciform recesses have been proposed, many of which offer improved performance. However, each of these has represented a compromise and has had certain disadvantages. In general, they have lacked the strength and durability desirable in high performance applications. Many of them are difficult or impossible to forge because of the configuration of the wrenching surfaces. Frequently, failure of the fastener will be encountered by the action of the driver, resulting in deformation of the wrenching surface. Others produce resultant forces when the torque is applied which tend to cam the driver out of the socket. The application of a reverse torque for loosening the fastener has presented difficulties, and fasteners with some recess configurations have been almost impossible to remove after having been tightened to the limit. There are various other problems attendant certain designs, such as requiring a driver that is subject to breakage or which may not be adaptable to use with power tools.

SUMMARY OF THE INVENTION

The present invention provides a fastener wrenching means which overcomes the deficiencies of the prior art and provides a truly balanced system in which both the fastener and the driver are strong and durable. The design includes an equal number of recess pockets and intermediate webs, which are substantially equal in shear area. This provides generally equal strength in the fastener and the driver. Both forward and rearward wrenching surfaces are planar and parallel to the axis of the fastener. The projections of the wrenching surfaces intersect the longitudinal axis of the fastener, which allows maximum torque to be generated in both securing and removing the fastener.

An object of this invention is to provide an improved wrenching means for a rotatable fastener.

An additional object of this invention is to provide a wrenching means providing the fastener with great strength and durability, yet which is readily and economically manufactured in mass production by simple tooling and procedures.

A further object of this invention is to provide a fastener wrenching means capable of producing high torque on the fastener without damage either to the fastener or to the driver, and which will withstand repeated operations without failure.

Yet another object of this invention to provide a fastener wrenching means such that the driving forces have little or no tendency to dislodge the driver from the fastener.

These and other objects will become apparent from the following detailed description taken in connection with the accompanying drawing.

DESCRIPTION OF THE PREFERRED EMBODIMENT

Figure 1:
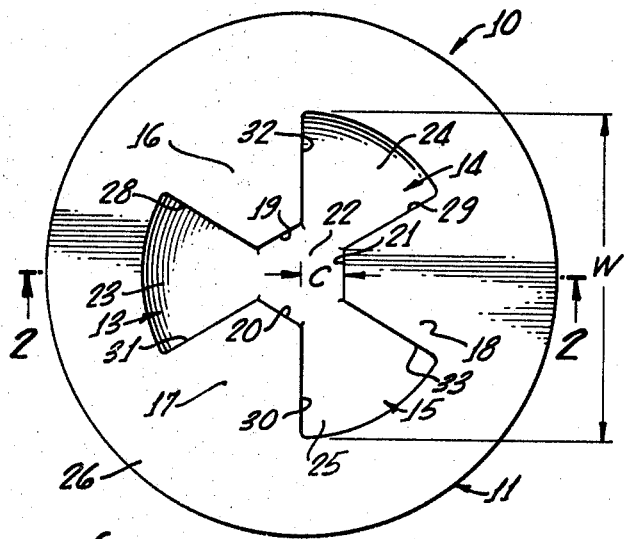
FIG. 1 is a top plan view of a flush head fastener utilizing the wrenching provision of this invention.
Figure 2:
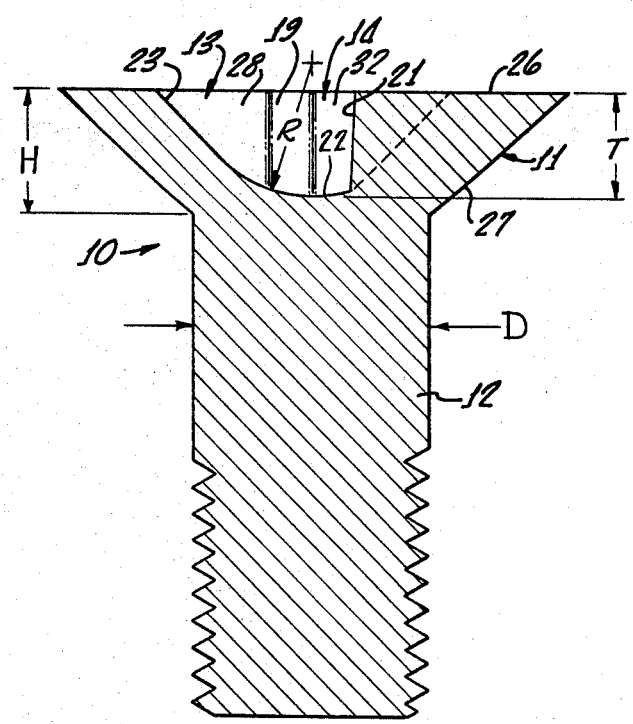
FIG. 2 is a fragmentary longitudinal sectional view taken along line 2-2 of FIG. 1.

As illustrated in FIGS. 1 and 2 the invention is utilized in conjunction with a flush head screw 10 having a head 11 from which a shank 12 projects. Within the head 11 is a recess that includes three equally spaced individual recesses or pockets, 13, 14 and 15. There are separated by three webs 16, 17 and 18. The inner ends 19, 20 and 21 of the webs 16, 17 and 18 respectively, are spaced from the axis of the fastener to leave a free central portion 22 of the recess. This allows the upsetting punch used in formation of the fastener head to have a solid web between the portions of the punch used to form the pockets 13, 14 and 15. The web surfaces 19, 20 and 21 may diverge slightly toward the exterior of the recess (each being typically inclined at approximately 7° to the fastener axis), but are substantially parallel to the axis of the fastener. This provides the webs 16, 17 and 18 with a maximum length in the radial direction. The outer end surfaces 23, 24 and 25 of the pockets 13, 14 and 15 taper axially inwardly from the end of the surface 26 of the fastener head 11 to the central portion 22 of the recess. These outer end walls are arcuate, their major portions being segments of a cone coaxial with the fastener 10. Typically, the included angle of the cone is 100°. This corresponds to the included angle commonly used for the frustoconical undersurface of a flush head fastener. In the design shown, therefore, the surfaces 23, 24 and 25 are parallel to the undersurface 27 of the head 11, assuring a full thickness of material beneath all sections of the recess. The same recess configuration, however, is applicable to protruding head fasteners.

The surface of the recess at the central portion 22 is a spherical segment that extends into the radially inner portions of the pockets 13, 14 and 15 where it is tangent to the conical segments 23, 24 and 25. This arrangement results in a recess that is shallow and relatively wide, with no sharp bends along its inner surface. The latter feature materially improves the fatigue resistance of the fastener by avoiding stress concentrations. Also, the punch used in forming the recess is more easily manufactured by turning on a lathe to shape the end surface of the punch, and then machining the pockets corresponding to the webs 16, 17 and 18. The configuration of the punch provides it with an improved life span.

The widths of the pockets 13, 14 and 15 and of the webs 16, 17 and 18 are substantially the same. Thus, each pocket and each web extend through an arc of approximately 60°.

For a right-hand thread on the fastener 10, the surfaces 28, 29 and 30 of the pockets 13, 14 and 15 receive the application of the driving torque. These are radial surfaces that are planar and parallel to the axis of the fastener. Consequently, they are positioned such that extensions of the surfaces 28, 29 and 30 would intersect at the longitudinal axis of the fastener. The opposite sidewalls 31, 32 and 33 of the pockets 13, 14 and 15 are similar. Thus, again, the surfaces are planar and, if projected, would intersect at the axis of the fastener.

For optimum performance of a fastener provided with the recess of this invention, certain proportions have been found to hold true throughout a full range of fastener sizes. This proportioning may be followed for a flush head screw or for a screw with a protruding head. In this proportioning the maximum lateral width of the recess $W$ is equal to approximately 1.18 times the diameter $D$ of the shank 12. Thus, $W=1.18D$. The recess depth $T$ is equal to approximately 0.88 times the head height $H$ (or $0.37D$ for 100° flush head tension screws as currently dimensioned in aircraft practice). The core width $C$ at the center of the recess, i.e., the maximum distance between the axis and any one of the web surfaces 19, 20 and 21, equals approximately one-eighth the recess width, or $$C = \frac{W}{8}$$

The radius $R$ used to generate the spherical segment at the center of the recess is approximately 2.31 times the core width, or $R=2.31C$.

Figure 3:
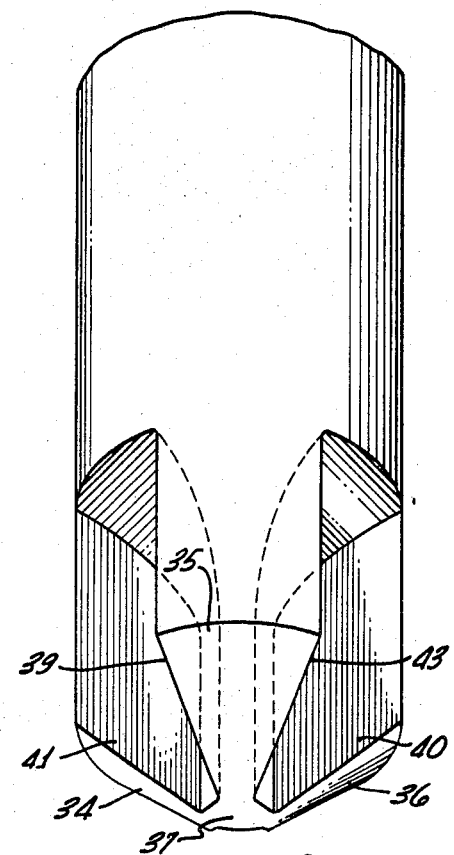
FIG. 3 is a fragmentary perspective view of a driver bit used for the fasteners of FIGS. 1 and 2.
Figure 4:
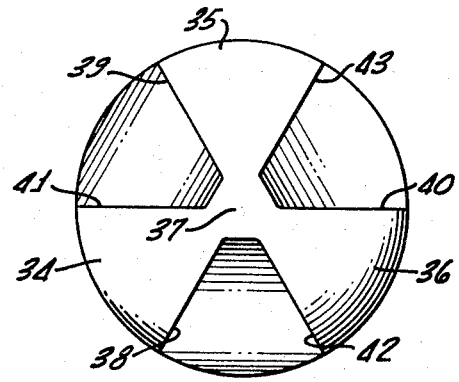
FIG. 4 is an end elevational view of the driver bit.

The driver for the fastener 10, shown in FIGS. 3 and 4, includes a bit having an end substantially complementary to the recess in the head 11. The bit includes three flutes 34, 35 and 36 which are dimensioned to fit closely within the pockets 13, 14 and 15 of the recess in the head 11. The end walls of the flutes taper, being substantially shaped as segments of a cone and interconnected at the central portion 37 of the bit. The driving faces 38, 39 and 40 as well as the faces 41, 42 and 43 for the application of reverse torque, are planar, and, if extended inwardly, would intersect at the axis of the bit.

The resulting construction provides a fastener recess having numerous advantages. In the first place, it is very easily produced on a low-cost, mass-production basis by simple tooling of symmetrical configuration. It is readily adapted to manufacture by forging or upsetting. The screw becomes ideally suited to formation in this manner in view of the nearly equal volumes of the punch and the recess. The punch volume exceed that of the recess by only the relatively small volume at the central core of the recess. Therefore, practically no material must be gathered when the head is upset, being derived instead from the recess. The simple and symmetrical shape of the fastener causes it to be strong in both tension and torsion.

It is particularly advantageous that the pockets and webs of the recess are all of substantially the same widths. This means that, when the complementary driver bit is inserted into the socket, it will have shear areas across its flutes 34, 35 and 36 which are nearly equal to the shear areas of the fastener at the webs 16, 17 and 18, and to that at the thread minor diameter. Thus, there is a balance between the driver and the fastener, so that substantially equal shear areas are realized in both. This leads to a long life for both the driver and the fastener, as neither is prone to premature failure. Also, the webs are of full dimension radially, which contributes to their strength. Moreover, the driver is readily manufacturable at a low cost be virtue of its simple and symmetrical shape. Also, the driver is well adapted for operation by power tools. With the same recess configuration being applicable to both flush and protruding head screws, one driver may be used for both head styles.

The inclusion of the planar driving faces that intersect the axis of the fastener offers a further advantage. This results in maximum application of torque to the fastener, and the driving force produces the most effective resultant for causing rotation of the fastener. This is true for either installation or removal of the fastener. Even when the fastener is tightened to its limit, the reverse driving faces are capable of accepting a full torque load that will allow the fastener to become loosened. The configuration of the driving recess permits the fastener to be tightened sufficiently to develop full tensile and fatigue strengths. The fact that the driving faces are planar and parallel to the axis of the fastener means that bending deflections are minimized. This also minimizes the cam-out forces which would tend to force the driver out of the recess as torque is applied. The lives of the fastener and driver are prolonged. The driver indexes readily in the recess, is self-centering and will tolerate some misalignment.

Furthermore, the efficient distribution of material in the fastener means that its weight is very low. In production, the fastener recess is readily inspected by means of simple gauges. The recess has a distinctive appearance that is easily recognizable so that there will be virtually no tendency to select an improper driver for it. The recess is manufacturable in a full range of sizes and with any material.

With the center core $C$ being narrow, and the web faces 19, 20 and 21 being nearly parallel to the screw axis, the webs 16, 17 and 18 are made relatively long radially of the screwhead. This may be seen, for example, in FIG. 2 where the cross section of the web 18 appears in the right-hand portion of the view, and the full dimension transversely of the fastener can be seen. Even a adjacent the bottom portion of the recess there is considerable solid material between the recess and the periphery 27 of the head. Therefore, tensile loads are transmitted axially along the screw shank 12 to the screwhead 11, where they are conducted outwardly through the radially long, and therefore strong, webs 16, 17 and 18 to the bearing along the undersurface 27 of the head. The large webs effectively resist and distribute the tensile loads applied to the fastener. The webs are stiff and additionally resist bending from the shear loads on the fastener normal to its axis. The webs also are of sufficient strength to withstand torsional loads imposed during tightening and loosening of the fastener.

Further strength is gained from the shallow nature of the recess. When proportional as outlined above, the recess depth is less than the height of the head. This means that the recess is entirely within the head, and does not extend axially into the shank 12 of the screw. Therefore, the screw shank, including the portion at the base of the head 11, is of full cross section throughout its length. Only where the exterior transverse dimension is increased at the screwhead is the central portion removed in defining the recess. The bottom of the recess is spaced a finite distance axially from the beginning of the shank 12.

The strength of a fastener made in accordance with this invention is so great that when tested to destruction the failure will occur at the threads rather than at the vicinity of the recess. In conventional designs, on the other hand, failures inevitably take place around the recess, so that the maximum potential strength of the fastener is not realized.

The spherical contour of the recess center bottom surface is more conducive, also, to preserving strength and fatigue resistance in the material of the fastener. The grain structure of a fastener is aligned longitudinally of it. When the recess is made conical or other similar shape at its bottom, the grains are separated by the punch as the recess is formed. This tends to tear the material, starting minute cracks that can lead to an easy failure from fatigue. The inner and outer portions of the recess are smoothly faired where the spherical inner ends 22 joins the conical portions 23, 24 and 25 for further improving fatigue resistance. With the spherical surface being tangent to those that are segments of a cone, the transition is uninterrupted and there is no location for stress concentrations to occur.

I claim:

1. A fastener comprising:
    a member having a shank and a head;
        said head having an axially outer end surface remote from said shank;
        and being provided with a recess extending axially inwardly of said outer end surface;
            said recess having a central portion at the axis of said member and a plurality of pockets communicating with said central portion and extending radially outwardly therefrom so as to leave intermediate portions of said head between adjacent ones of said pockets;
            said pockets and said intermediate portions being of substantially the same width;
            said pockets having substantially radial sidewalls;
            said central portion of said recess and radially inner portions of said pockets having a first axially inner end wall defined by a segment of a sphere;
            the radially outer portions of said pockets having second axially inner end walls connecting to said first axially inner end wall and smoothly faired relative thereto, said second axially inner end walls being defined by segments of a cone;
            said intermediate portions having radially inner faces around said central portion of said recess substantially parallel to the axis of said member.

2. A device as in claim 1 in which the maximum radial dimension of said recess at said outer end surface is equal to approximately 1.18 times the diameter of said shank.

3. A device as recited in claim 1 in which said inner faces of said intermediate portions are spaced from said axis by a distance equal to approximately 1.18 times the diameter of said shank divided by 8.

4. A device as recited in claim 1 in which the maximum depth of said recess is equal to approximately 0.88 times the axial length of said head.

5. A device as recited in claim 1 in which said first axially inner end wall has a radius equal to approximately 2.31 times the distance said inner faces are spaced from said axis.

6. A fastener comprising:
a member having a portion adapted for connection to another element upon relative rotation of said member and said element;
said member having a recess therein;
said recess having a central portion and a plurality of pockets communicating with said central portion and extending outwardly therefrom;
said pockets being of substantially the same width and being substantially equally spaced-apart angularly;
said pockets defining intermediate portions of said member therebetween which are substantially equal in widths to the widths of said pockets;
each of said pockets including two side edges for engagement for a driving tool for applying torque to said member;
said two side edges of each of said pockets being in opposed relationship;
said two side edges of each of said pockets being planar and positioned such that projections thereof would intersect at the longitudinal axis of said member;
said intermediate portions including inner surface portion around central portion of said recess;
said inner surface portions being substantially parallel to said longitudinal axis;
said pockets having radially outer and axially inner end surface portions defined by conical segments;
said central portion of said recess having an axially inner end surface defined by a segment of a sphere.

7. A device as recited in claim 6 in which said conical segments are substantially tangent to said inner end surface of said central portion.

8. A fastener comprising:
a member having a portion adapted for connection to another element upon relative rotation of said member and said element;
said member having a recess therein;
said recess having a central portion and a plurality of pockets communicating with said central portion and extending outwardly therefrom;
said pockets being of substantially the same width and being substantially equally spaced-apart angularly;
said pockets defining intermediate portions of said member therebetween which are substantially equal in widths to the widths of said pockets;
each of said pockets having two side edges for engagement with a driving tool for applying torque to said member;
said two side edges being in opposed relationship said recess including first radially outer and axially inner surfaces intermediate side edges;
said first surfaces being defined by conical segments;
said recess including a second arcuate radially and axially inner surface connected to said first surfaces and smoothly faired relative thereto;
said intermediate portions including generally axially directed inner surface portions around said central portion of said recess;
said inner surface portions being substantially equal in widths to the widths of the inner ends of said pockets.

9. A driving tool for a rotatable fastener comprising:
an elongated member having a plurality of substantially longitudinally extending flutes separated by substantially longitudinally extending recesses;
said flutes being of substantially the same width and being substantially longitudinally extending recesses;
said flutes being of substantially the same width and being substantially equally spaced angularly;
said recesses being of substantially the same widths as the widths of said flutes;
said flutes having substantially radial sidewalls defining the sidewalls of said recesses such that each of said recesses includes a pair of said sidewalls in opposed relationship;
said flutes being joined in the axial portion of said member and presenting surfaces interconnecting said sidewalls at the radially inner portions of said recesses;
said interconnecting surfaces being relatively narrow with respect to said sidewalls and substantially parallel to the axis of said member;
said flutes and recess terminating at an axially outer end wall of said member;
said end wall along at least portions of said flutes being defined by outer substantially conical segments connected and faired smoothly with a convex arcuate central portion of said end wall.

10. A device as recited in claim 9 in which said central portion of said end wall is substantially spherical.

PO-1050
(5/69)

UNITED STATES PATENT OFFICE
CERTIFICATE OF CORRECTION

Patent No. 3,575,080            Dated Apr. 13, 1971

Inventor(s) Patrick M. Hannay

It is certified that error appears in the above-identified patent and that said Letters Patent are hereby corrected as shown below:

Cover page, [22] Filed, should read -- Dec. 26, 1968 --. Column 1, line 19, "fastener" should read -- fasteners --; line 66, after "invention" insert -- is --. Column 2, line 14, after "18" (second occurrence) insert -- , --. Column 3, line 23, "exceed" should read -- exceeds --. Column 4, line 1, after "Even" delete "a"; line 14, "proportional" should read -- proportioned --; line 39, "ends" should read -- end --. Column 5, line 20, "spaced-apart" should read -- spaced apart--; line 35, after "around" insert -- said --; same line, "portion" (first occurrence) should read -- portions --. Column 6, line 4, "spaced-apart" should read -- spaced apart --; delete lines 28 and 29 in their entirety; and insert the following claim; after line 52

11. A device as recited in claim 1 in which there are three of said pockets and three of said intermediate portions.

Signed and sealed this 12th day of October 1971.

(SEAL)
Attest:

EDWARD M. FLETCHER, JR.
Attesting Officer

ROBERT GOTTSCHALK
Acting Commissioner of Pate